United States Patent [19]

Carroll et al.

[11] 4,391,349
[45] Jul. 5, 1983

[54] TURBOMACHINE LUBRICATING OIL SYSTEM

[75] Inventors: Alexander A. Carroll, Greensburg; William F. Hannan, III, Pittsburgh, both of Pa.

[73] Assignee: Carrier Corporation, Syracuse, N.Y.

[21] Appl. No.: 133,063

[22] Filed: Mar. 24, 1980

[51] Int. Cl.³ .............................................. F01M 1/00
[52] U.S. Cl. .................................................. 184/6.26
[58] Field of Search .................. 184/6.26, 6.3, 6.4, 184/6.11

[56] References Cited

U.S. PATENT DOCUMENTS

| | | | |
|---|---|---|---|
| 1,291,839 | 1/1919 | Gorham | 184/6.5 |
| 1,713,872 | 5/1929 | Hunt | 184/6.5 |
| 1,875,718 | 9/1932 | Ford | 184/6.5 |
| 2,886,133 | 5/1959 | Mauck et al. | 184/6.26 |
| 3,082,936 | 3/1963 | Prucha | 184/6.26 |
| 3,101,129 | 8/1963 | Hulten | 184/6.3 |

OTHER PUBLICATIONS

Elliot Co., Drawing PAP-299C, 9/13/68.

*Primary Examiner*—Sal Cangialosi
*Attorney, Agent, or Firm*—Donald F. Daley; David J. Zobkiw

[57] ABSTRACT

A turbomachine lubricating oil system comprising a casing having a relatively large diameter member rotatably mounted therein with a chamber defined thereby. A support for said casing includes a generally hollow structural member defining a quiescent plenum. Lubricating oil flows from said casing chamber to the quiescent plenum. Oil flows from the quiescent plenum to a lubricating oil reservoir.

2 Claims, 2 Drawing Figures

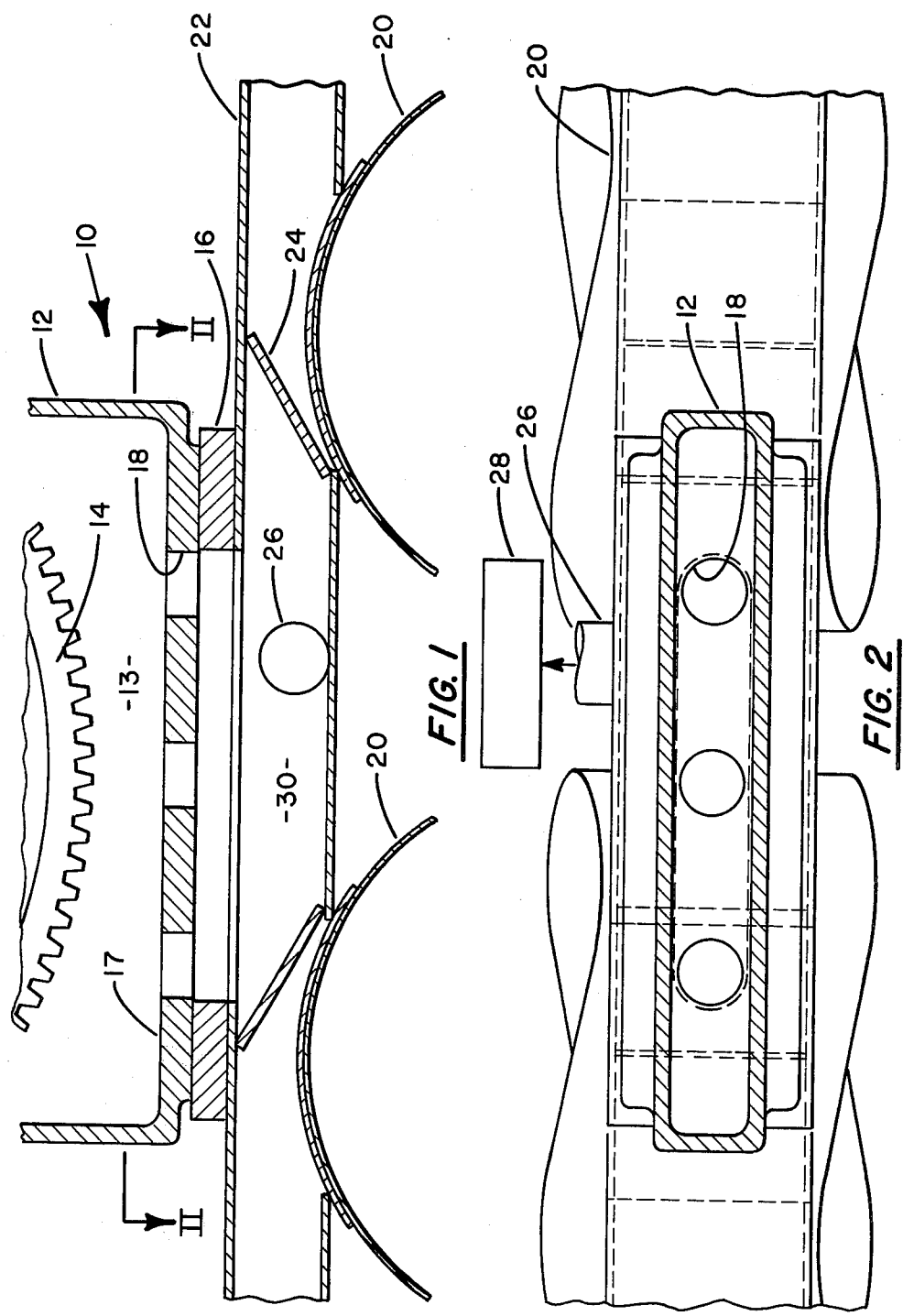

TURBOMACHINE LUBRICATING OIL SYSTEM

BACKGROUND OF THE INVENTION

This invention relates to a turbomachine lubricating oil system, and in particular, to a lubricating oil system incorporating a structural support member of the turbomachine.

In turbomachinery, a gear or other rotating member having a relatively large diameter and operable at a relatively high velocity, will produce foaming or frothing of the oil if moved through a body thereof. To avoid the foaming problem, a spray of cooling oil is directed at the gear to lubricate and cool the same. This eliminates the need for a pool or reservoir of oil within the gear box for adequate lubrication of same. The spray of oil contains some air. If the oil were to collect within the gear box due to improper drainage, the oil-air mixture would froth or foam due to turbulence produced as the gear moves through the pool of oil.

If the oil drains from the housing or casing through a relatively small diameter conduit and a pool of oil were to form, frothing or foaming of the oil will increase the back pressure within the conduit thereby preventing free flow of oil therethrough. The increased resistance to oil flow through the conduit will result in a further backup of the oil within the casing. Excess oil within the casing increases the horsepower required to rotate the member through the oil. This in turn reduces the overall operating efficiency of the turbomachine.

Accordingly, it is desirable to enable the oil to freely drain from a casing and to minimize frothing of the oil prior to the oil entering a conduit for return to an oil reservoir.

SUMMARY OF THE INVENTION

It is accordingly an object of this invention to improve turbomachine lubricating oil systems.

It is a further object of this invention to enable lubricating oil to freely drain from a casing and to minimize frothing or foaming thereof prior to the oil entering a conduit for return to an oil reservoir.

It is yet another object of this invention to provide a quiescenting chamber for the oil to minimize frothing or foaming thereof prior to the oil entering a conduit.

These and other objects of the present invention are attained in a turbomachine lubricating oil system comprising a casing; a relatively large diameter member mounted within a chamber defined by said casing and rotating at a substantially high velocity therein; support means for said casing including a generally hollow structural member defining a quiescent plenum; fluid flow means communicating said casing chamber and the quiescent plenum for enabling oil to flow from said chamber to said plenum; a lubricating oil reservoir located in spaced relation to said plenum; and a conduit in fluid flow communication with said quiescent plenum and said lubricating oil reservoir for delivering oil from said plenum to said reservoir.

BRIEF DESCRIPTION OF THE DRAWING

FIG. 1 is a partial sectional view of a turbomachine including the lubricating oil system of the present invention; and FIG. 2 is a sectional view taken along lines II—II of FIG. 1.

DESCRIPTION OF THE PREFERRED EMBODIMENT

Referring now to the drawing there is disclosed a preferred embodiment of the present invention. The invention relates to a lubricating oil system for a turbomachine such as a compressor or turbine.

The turbomachine, generally referenced by numeral 10, includes a housing 12 having a relatively large diameter rotating member disposed within chamber 13 defined by the housing. In the preferred embodiment, rotating member 14 is a gear used to drive the rotor of the turbomachine, and housing 12 is the gear casing. Lubricating oil is delivered into chamber 13 as a spray from a source thereof for lubricating gear 14.

The bottom of housing 12 includes a generally planar wall 17 having a plurality of apertures or flow passages 18 provided therethrough. Passages 18 are provided within wall 17 to permit the flow of lubricating oil from gear casing 14 into chamber or plenum 30.

Chamber 30 is defined within a structural member 22 used to support the gear casing. In the preferred embodiment structural support member 22 is a hollow box beam. The beam includes baffles 24 disposed therein to define the sidewalls of plenum 30. Beam 22, in turn is supported by feet 20 which rest on the ground or mounting platform for supporting the weight of the turbomachine. A mounting plate 16 may be placed between housing 12 and beam 22 for added structural strength. Conduit 26 is in communication with chamber 30 and an oil reservoir 28 disposed at a distance from the chamber. In the preferred embodiment, conduit 26 is defined by a four inch diameter pipe and extends for approximately sixty inches from chamber 30 to oil reservoir 28.

As discussed previously, unless oil sprayed into chamber 13 for cooling member 14 drains freely therefrom, pockets of oil will form. Rotation of member 14 through the pockets of oil will cause the oil to froth or foam at the oil-air interface. Frothing of the oil tends to restrict free flow thereof through a conduit. It has been found that when the oil sprayed into chamber 13 is delivered directly from the casing to an oil reservoir via the use of a relatively small diameter, e.g. four inch pipe, frothing of the oil within the conduit restricts the free flow thereof, causing the oil to backup within chamber 13. Greater horsepower is required to force the rotating member 14 to move through pockets of excess oil. The extra horsepower required to enable the member 14 to rotate through the excess oil contained within chamber 13 as a result of the restricted drainage therefrom reduces the overall operating efficiency of the turbomachine.

To insure that the oil drains freely from chamber 13 and that oil entering conduit 26 will be essentially free of foam, the oil is permitted to drain freely via gravity from chamber 13 through flow passages 18 provided in wall 17. The oil passes into chamber 30 defined within the structural support member 22. Since the oil is stored within chamber 30 at a point remote from rotating member 14, the oil will settle and become essentially quiescent before it enters conduit 26. By utilizing a box beam to define the quiescent plenum or chamber 30, an area is provided for enabling the oil to become quiescent without increasing the cost of manufacturing or increasing the complexity of manufacture of the turbomachine. In effect, the structural member heretofore used to support the casing is used in an additional manner to provide the quiescent plenum.

While a preferred embodiment of the present invention has been described and illustrated, the invention should not be limited thereto but may be otherwise embodied within the scope of the following claims.

We claim:

1. A turbomachine lubricating oil system comprising:
   a casing defining a chamber having a plurality of apertures in the bottom;
   a relatively large diameter member mounted within said chamber and rotating therein with said member being cooled and lubricated via a spray of lubricating oil which drains from said casing via said plurality of apertures;
   structural support means for said casing including a generally hollow member defining a plenum having inlet means communicating with the interior of said chamber via a plurality of apertures to receive the lubricant flowing therefrom and outlet means;
   a separate lubricating oil reservoir located in spaced relation to said structural support means, and
   means connecting said reservoir with said outlet means, the size of said plenum when compared to the size of said outlet means being such that lubricant flowing into said plenum will collect and form into a quiescent pool before draining therefrom.

2. A method of minimizing the horsepower required to rotate a relatively large diameter, high speed turbomachine member confined within a casing and cooled by lubricating oil sprayed thereon with the lubricating oil tending to collect within a casing containing the rotating member comprising the steps of:
   draining the oil from the casing to a plenum;
   making oil in the plenum quiescent; and
   delivering the quiescent lubricating oil from the plenum to a reservoir for eventual supply to the casing as a spray.

* * * * *